United States Patent [19]

Miyaji et al.

[11] Patent Number: 4,675,508
[45] Date of Patent: Jun. 23, 1987

[54] ELECTRICALLY HEATED VACUUM BOTTLE

[75] Inventors: Kenichi Miyaji; Shouji Toida; Seiichi Ito; Kazunori Iwasaki; Masatoshi Kishida, all of Niigata, Japan

[73] Assignee: Nippon Sanso Kabushiki Kaisha, Japan

[21] Appl. No.: 748,995

[22] Filed: Jun. 26, 1985

[30] Foreign Application Priority Data

Jun. 29, 1984 [JP] Japan ............................... 59-98361[U]

[51] Int. Cl.$^4$ ...................... A47J 41/00; A47J 31/00; H05B 3/82
[52] U.S. Cl. ...................................... 219/437; 99/281; 99/312; 215/13 R; 219/316; 219/318; 219/336; 219/523; 220/420
[58] Field of Search ................................ 219/436–442, 219/315, 336, 335, 338, 316, 318, 523, 202, 415–419; 99/281, 312; 220/420, 421; 215/13 R

[56] References Cited

U.S. PATENT DOCUMENTS

| | | | |
|---|---|---|---|
| 1,368,152 | 2/1921 | Huff | 219/417 |
| 1,521,148 | 12/1924 | Dennett et al. | 220/421 |
| 3,129,318 | 4/1964 | Morrison | 219/441 |
| 3,405,899 | 10/1968 | Tractenberg et al. | 219/202 X |
| 3,423,571 | 1/1969 | Tractenberg et al. | 219/523 X |
| 3,549,861 | 12/1970 | Tractenberg et al. | 219/441 |
| 4,464,983 | 8/1984 | Chappell et al. | 99/312 |

FOREIGN PATENT DOCUMENTS

| | | | |
|---|---|---|---|
| 594407 | 3/1934 | Fed. Rep. of Germany | 219/438 |
| 3122843 | 1/1983 | Fed. Rep. of Germany | 219/437 |
| 1305731 | 8/1962 | France | 219/315 |
| 159849 | 4/1933 | Switzerland | 220/420 |

*Primary Examiner*—Anthony Bartis
*Attorney, Agent, or Firm*—Kane, Dalsimer, Kane, Sullivan and Kurucz

[57] ABSTRACT

A vacuum bottle of the electric heater type includes a body having a tubular outer shell and a tubular inner shell disposed within the outer shell to form a hermetically sealed thermal insulation vacuum space therebetween. A tubular connecting member has an open lower end and an upper end wall having an aperture formed therethrough. The upper end wall of the connecting member is fixedly hermetically secured to a lower surface of a bottom wall of the inner shell with the apertures therein in communication, and the tubular connecting member is fitted in an aperture of a bottom wall of the outer shell and fixedly hermetically secured thereto adjacent to the open lower end thereof to hold the bottom walls of the inner and outer shells in spaced sealed relation to each other. An electric heater is mounted within the inner shell for heating contents of the inner shell. The electric heater has a body part of which extends downwardly through the aperture in the bottom wall of the inner shell in sealed relationship therewith and the aperture in the upper end wall of the tubular connecting member. The aperture in the upper wall of the connecting member is greater than that of the inner shell bottom wall to accommodate any misalignment therebetween.

4 Claims, 8 Drawing Figures

4,675,508

ELECTRICALLY HEATED VACUUM BOTTLE

BACKGROUND OF THE INVENTION

1. Field of the Invention

This invention relates to a Thermos or vacuum bottle equipped with an electric heater for boiling or heating water or the like contained therein.

2. Prior Art

A conventional vacuum bottle comprises a body including a pair of inner and outer shells spaced from each other to provide a thermal insulation space therebetween which is evacuated, and an electric heater disposed within the inner shell for heating the contents thereof. The bottoms of the inner and outer shells partly overlap each other, and apertures are formed respectively through the overlapping portions of the shell bottoms and disposed in alignment with each other. The lower portion of the electric heater extends through the aligned apertures of the shell bottoms, and a sealing element is provided between the bottom of the inner shell and the lower portion of the electric heater to provide a liquid-tight seal therebetween. With this construction, for assembling the vacuum bottle, it is necessary that the respective apertures of the two shell bottoms should be brought into alignment with each other so that the lower portion of the electric heater can be properly passed therethrough. Therefore, close manufacturing tolerances are required for the inner and outer shells. In addition, much effort is required for the assembly of the vacuum bottle in the case where the apertures of the shell bottoms are not accurately in alignment with each other. It has also been proposed to space the bottoms of the inner and outer shells from each other. However, with the conventional vacuum bottle, it has been difficult to provide a sufficient spacing between the two bottoms, so that the heat can be easily transferred from the inner shell via the outer shell to the exterior of the vacuum bottle, which results in the failure to provide a good thermal insulation of the vacuum bottle.

SUMMARY OF THE INVENTION

It is therefore an object of this invention to provide a vacuum bottle with an electric heater which can utilize the inner and outer shells of less close manufacturing tolerances and can achieve a higher heat insulation.

According to the present invention, there is provided a vacuum bottle of the electric heater type comprising:

(a) A body including a tubular outer shell and a tubular inner shell. The inner shell is disposed generally coaxially within the outer shell to form a thermal insulation vacuum space therebetween. Each of the inner and outer shells has a bottom wall having an aperture formed therethrough.

(b) A tubular connecting member having an open lower end and an upper end wall. The upper end wall has an aperture formed therethrough, the upper end wall being fixedly secured to a lower surface of the bottom wall of the inner shell, the tubular connecting member being fitted in the aperture of the bottom wall of the outer shell and fixedly secured thereto adjacent to the open lower end thereof to hold the bottom walls of the inner and outer shells in spaced relation to each other. The space between the inner and outer shells are evacuated to define a thermal insulation vacuum space therebetween. The aperture in the upper end wall of the tubular connecting number is greater than the aperture in the bottom wall of the inner shell.

(c) An electric heater disposed within the inner shell for heating contents of the inner shell, the electric heater having a body part of which extends downwardly through the aperture in the bottom wall of the inner shell and the aperture in the upper end wall of the tubular connecting member.

DESCRIPTION OF THE PREFERRED EMBODIMENTS OF THE INVENTION

Figure 1:
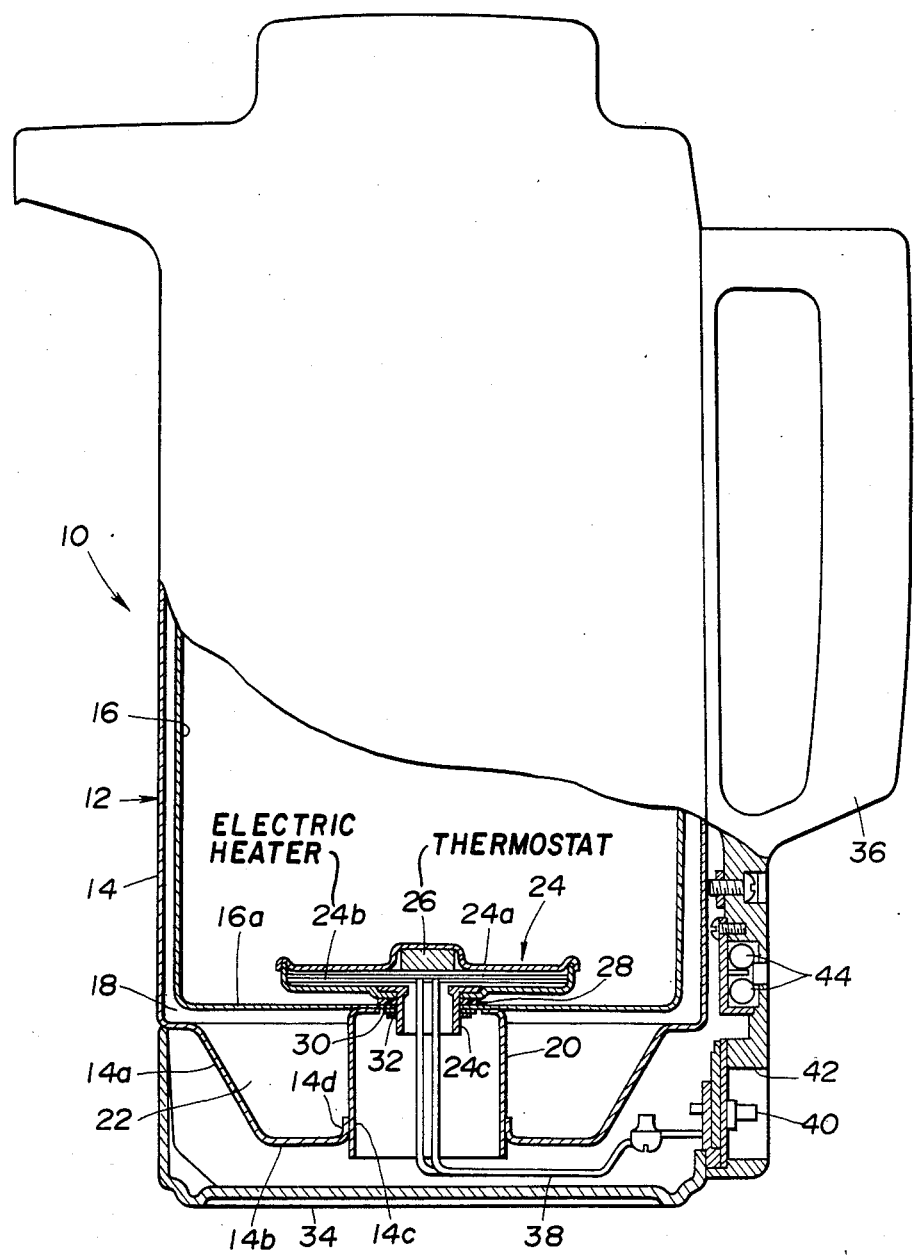
FIG. 1 is a partly-broken side-elevational view of a vacuum bottle provided in accordance with the present invention.

A Thermos or vacuum bottle 10 of the electric heater type shown in FIG. 1 comprises a body 12 including an outer shell 14 and an inner shell 16 disposed generally coaxially within the outer shell 14 in spaced relation thereto to provide a thermal insulation space 18 therebetween which is evacuated, each of the shells 14 and 16 being of a circular cross-section.

Figure 2:
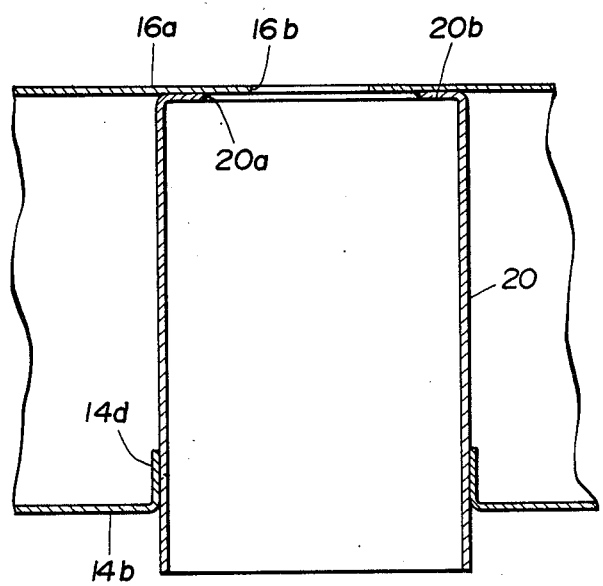
FIG. 2 is a fragmentary cross-sectional view of the vacuum bottle, showing a bottom portion thereof.

The inner and outer shells 16 and 14 are interconnected at their lower ends by a tubular connecting member 20 of an inverted cup-shape having an open bottom. The outer shell 14 has a frusto-conical bottom portion 14a having a flat bottom wall 14b which has a central aperture 14c formed therethrough, the edge of the central aperture 14c being inturned to form a tubular portion 14d extending along the axis of the outer shell 14. The inner shell 16 has a flat bottom wall 16a having a central aperture 16b formed therethrough as best shown in FIG. 2. The connecting tubular member 20 has a central aperture 20a formed through an upper end wall 20b held in engagement with the lower surface of the bottom wall 16a and fixed thereto by brazing. The aperture 20a is greater in diameter than the aperture 16b in the bottom wall 16a of the inner shell 16. The tubular connecting member 20 is fitted in the tubular portion 14d of the outer shell 14 and fixed thereto by brazing adjacent to the lower open end thereof as later described, so that the bottom wall 16a of the inner shell 16 is spaced from the bottom wall 14a of the outer shell 14. As a result, there is provided at the bottom portion of the body 12 an annular space 22 defined by the bottom walls 14a and 16a and the outer periphery of the tubular connecting member 20, thereby enhancing the thermal insulation of the vacuum bottle 10.

An electric heater 24 is disposed within the inner shell 16 and comprises a casing 24a of a generally disc-shape, a thermostat 26 mounted within the casing 24a, an electric heating element 24b mounted within the casing 24a, and a lower tubular portion 24c extending downwardly from the casing 24a and having external threads formed in an outer periphery thereof. The casing 24a and the tubular portion 24c constitute a body of the electric heater 24. The tubular portion 24c is fitted in the aperture 16b formed through the bottom wall 16a of the inner shell 16 and extends through the aperture 20a formed through the upper end wall 20b of the tubular connecting member 20. A seal ring 28 made of elastomeric material such as silicone rubber is fitted on the tubular portion 24c of the electric heater 24 and is interposed between the casing 24a and the bottom wall 16a of the inner shell 16 to ensure a liquid-tight seal therebetween. A washer 30 is fitted on the tubular portion 24c and held against the lower surface of the bottom wall 16a, and a nut 32 is threaded on the external threads of the tubular portion 24c to fix the electric heater 24 relative to the bottom wall 16a.

A bottom member 34 of a cup-shape is secured to the outer shell 14 by screws, and a handgrip member 36 is secured to the bottom member 34 and the outer shell 14. Two lead wires 38 extend through the tubular portion 24c, the tubular connecting member 20, the bottom member 34, and one ends of the lead wires 38 are electrically connected to the electric heating element 24b while the other ends are electrically connected to terminals 40 of a plug receptacle 42. Pilot lamps 44 are mounted on the handgrip member 36 for indicating that the heater element 24b is energized.

Figure 3:
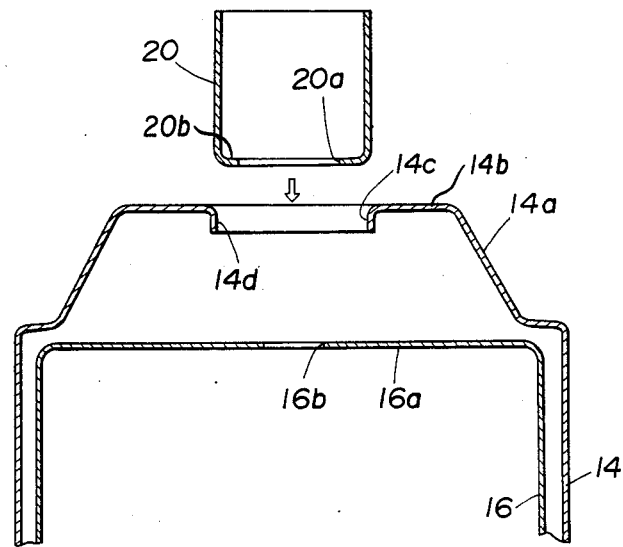
FIG. 3 is a fragmentary cross-sectional view of the vacuum bottle, showing a tubular connecting member before it is inserted into a body of the vacuum bottle.
Figure 4:
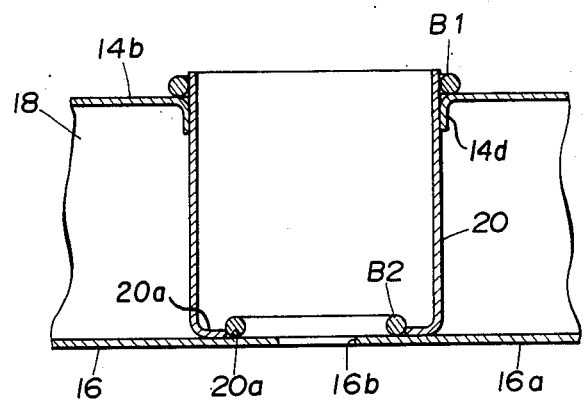
FIG. 4 is a fragmentary cross-sectional view of the vacuum bottle, showing the connection of the tubular connecting member to the body.

For assembling the vacuum bottle 10, the inner and outer shells 16 and 14 are connected together at their upper ends and fixed with respect to each other. Then, the inner and outer shells 16 and 14 thus connected are turned upside down as shown in FIG. 3, and the tubular connecting member 20 is inserted into the tubular portion 14d and is moved toward the bottom wall 16a until the upper end wall 20a is brought into engagement with the bottom wall 16a as shown in FIG. 4. The provision of the tubular portion 14d facilitates the insertion of the tubular connecting member 20 into the outer shell 14. The tubular connecting member 20 is secured to the bottom wall 14b of the outer shell 14 by brazing as at B1 (FIG. 4), and the connecting member 20 is also secured to the bottom wall 16a of the inner shell 16 by brazing as at B2. It is preferred that the brazing operation is carried out under vacuum so that the thermal insulation space 18 can be evacuated at the same time. This will reduce the manufacturing cost of the vacuum bottle.

Figure 5:
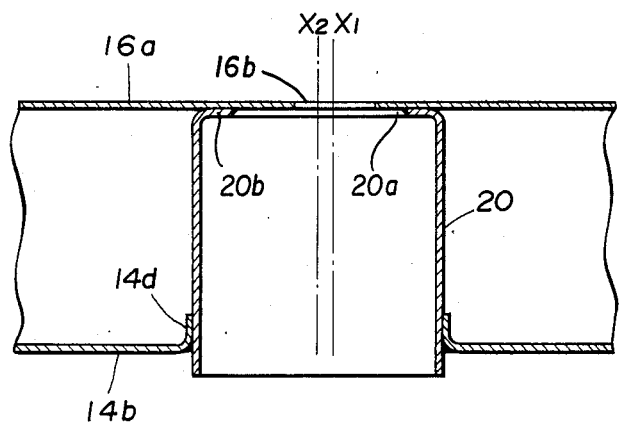
FIGS. 5 and 6 are views similar to FIG. 2 but showing the relation between the tubular, connecting member and the body.
Figure 6:
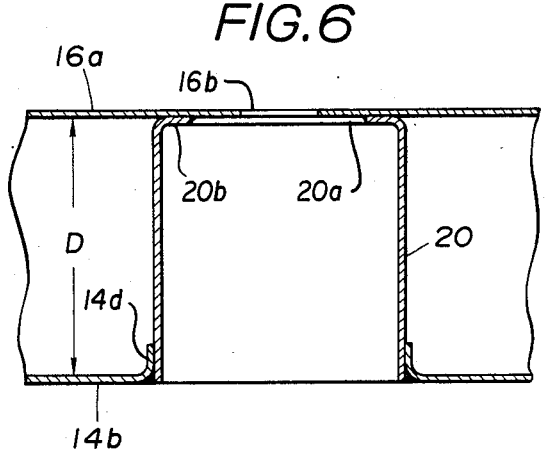

As described above, the bottoms of the inner and outer shells 16 and 14 are connected together through the agency of the tubular connecting member 20. With this construction, even if the axis X1 of the inner shell 16 is displaced slightly out of alignment with the axis X2 of the outer shell 14 as shown in FIG. 5, this will not affect a subsequent mounting of the electric heater 24 on the bottom wall 16a. Also, even if the bottom wall 14b of the outer shell 14 is displaced out of position with respect to the bottom wall 16a of the inner shell 16 (for example, the distance D between the two bottom walls 16a and 14a is greater than a desired distance), this will not cause any inconvenience for the subsequent mounting of the electric heater 24. Thus, undue accuracy is not required for connecting the inner and outer shells 16 and 14 by virtue of the provision of the tubular connecting member 20. And, close manufacturing tolerances are not required for the inner and outer shells 16 and 14. The distance between the two bottom walls 16a and 14a may be made greater, and the lower end portion of the tubular connecting member 20 may be reduced in diameter. These will further enhance the thermal insulation of the vacuum bottle 10.

Figure 7:
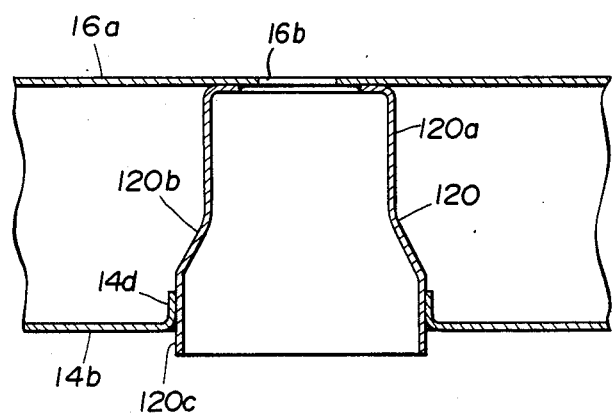
FIGS. 7 and 8 are views similar to FIG. 2 but showing modified tubular connecting members, respectively.

A modified tubular connecting member 120 shown in FIG. 7 has an upper portion 120a of a reduced diameter remote from the open end and a tapered intermediate portion 120b interconnecting the upper portion 120a and a lower portion 120c. By virtue of the provision of the reduced-diameter portion 120a, the tubular connecting member 120 can be easily inserted into the tubular portion 14d of the outer shell 14. In addition, the thermal insulation can be improved.

Figure 8:
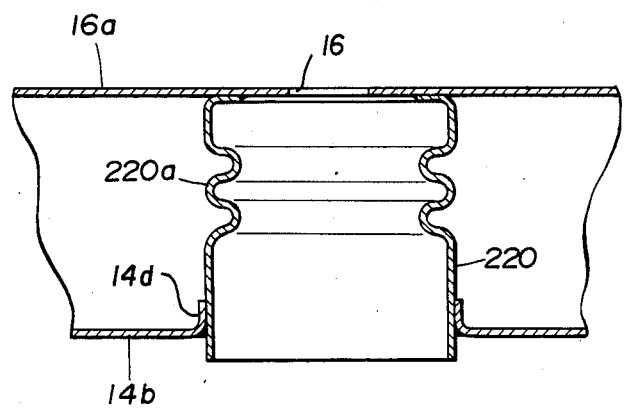

Another modified tubular connecting member 220 shown in FIG. 8 has a corrugated portion 220a intermediate opposite ends thereof. The corrugated portion 220a serves to reduce a transfer of heat from the inner shell 16 to the outer shell 14, thereby enhancing the thermal insulation of the vacuum bottle.

What is claimed is:

1. A vacuum bottle of the electric heater type comprising:
   (a) a body including a tubular outer shell and a tubular inner shell disposed generally coaxially within said outer shell to form a space therebetween, each of said inner and outer shells having a bottom wall having an aperture formed therethrough, the upper ends of said shells being hermetically sealed to each other and said bottom walls being spaced apart;
   (b) a tubular connecting member having an open lower end and an upper end wall having an aperture formed therethrough, said upper end wall being fixedly secured in hermetically sealed relation to a lower surface of said bottom wall of said inner shell with said apertures therein in communication, said tubular connecting member being fitted in said aperture of said bottom wall of said outer shell and fixedly secured in hermetically sealed relation thereto adjacent to the open lower end thereof to hold said bottom walls of said inner and outer shells in spaced relation to each other, said spaced between said inner and outer shells being evacuated to define a thermal insulation vacuum space therebetween, said aperture in said upper end wall of said tubular connecting member is greater than said aperture in said bottom wall of said inner shell; and
   (c) an electric heater mounted within said inner shell for heating contents of said inner shell, said electric heater having a body part of which extends downwardly through said aperture in said bottom wall of said inner shell in sealed relationship therewith and said aperture in said upper end wall of said tubular connecting member.

2. A vacuum bottle according to claim 1, in which the edge of said aperture in said bottom wall of said outer shell is inturned to provide a tubular portion extending along the axis of said outer shell, said tubular connecting member being fitted in and secured to said tubular portion.

3. A vacuum bottle according to claim 1, in which said tubular connecting member has an upper portion of a reduced diameter remote from said open end and a tapered intermediate portion interconnecting said upper portion and a lower portion thereof.

4. A vacuum bottle according to claim 1, in which said tubular connecting member has a corrugated portion intermediate opposite ends thereof.

* * * * *